United States Patent
Said et al.

(10) Patent No.: US 10,040,052 B2
(45) Date of Patent: Aug. 7, 2018

(54) COMPOSITE ADSORBENT FOR ADSORPTION CHILLER

(71) Applicant: KING FAHD UNIVERSITY OF PETROLEUM AND MINERALS, Dhahran (SA)

(72) Inventors: Syed Ahmed Mohammed Said, Dhahran (SA); Rached Ben Mansour, Dhahran (SA); Najam Ul Qadir, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 209 days.

(21) Appl. No.: 15/047,606

(22) Filed: Feb. 18, 2016

(65) Prior Publication Data

US 2017/0239643 A1    Aug. 24, 2017

(51) Int. Cl.
| | |
|---|---|
| *B01J 20/22* | (2006.01) |
| *B01J 20/20* | (2006.01) |
| *B01J 20/30* | (2006.01) |
| *C09K 5/04* | (2006.01) |

(52) U.S. Cl.
CPC .......... *B01J 20/226* (2013.01); *B01J 20/205* (2013.01); *B01J 20/3085* (2013.01); *C09K 5/047* (2013.01)

(58) Field of Classification Search
CPC .... B01J 20/226; B01J 20/205; B01J 20/3085; C09K 5/047
USPC ...................................................... 502/401
See application file for complete search history.

(56) References Cited

U.S. PATENT DOCUMENTS

| | | | |
|---|---|---|---|
| 7,485,279 B2 | 2/2009 | Pfefferle et al. | |
| 8,845,995 B2 | 9/2014 | Kauppinen et al. | |
| 2014/0020419 A1 | 1/2014 | Carruthers et al. | |
| 2015/0238930 A1* | 8/2015 | Said ...................... | B01J 20/226 502/401 |

FOREIGN PATENT DOCUMENTS

CN       102500389 A      6/2012

OTHER PUBLICATIONS

Shmroukh, et al. (2013). Adsorption refrigeration working pairs: The state-of-the-art in the application. International Journal of Chemical, Nuclear, Metallurgical and Materials Engineering. 7. 453-465. (Year: 2013).*
Lin et al. "Enhanced selective CO2 adsorption on polyamine/MIL-101(Cr) composites" J. Mater. Chem. A, 2014, 2, 14658, Jun. 30 2014, p. 14658-14665 (Year: 2014).*
Xiang, Z., Hu, Z., Cao, D., Yang, W., Lu, J., Han, B. and Wang, W. (2011), Metal-Organic Frameworks with Incorporated Carbon Nanotubes: Improving Carbon Dioxide and Methane Storage Capacities by Lithium Doping. Angew. Chem. Int. Ed., 50: 491-494, Dec. 3, 2010 (Year: 2010).*
Prasanth et al., "Enhanced hydrogen sorption in single walled carbon nanotube incorporated MIL-101 composite metal-organic framework," International Journal of Hydrogen Energy, vol. 36, Issue 13, Jul. 2011, pp. 7594-7601.
Anbia et al., "Development of MWCNT@MIL-101 hybrid composite with enhanced adsorption capacity for carbon dioxide," Chemical Engineering Journal, vol. 191, pp. 326-330, May 15, 2012. (Abstract only).
Ahmed et al., "Composites of metal-organic frameworks: Preparation and application in adsorption," materials today, vol. 17, Issue 3, pp. 136-146, Apr. 2014.
Maksimchuk et al., "Metal-organic frameworks of the MIZZL-101 family as heterogeneous single-site catalysts", Proc. R. Soc. A, doi:10.1098/rspa.2012.0072 (2012), pp. 1-18.
Zhao et al., "High-yield, fluoride-free and large-scale synthesis of MIL-101(Cr)", Dalton Trans., vol. 44 (2015), pp. 16791-16801.
G. Ferey et al., "A Chromium Terephthalate-based Solid with Unusually Large Pore Volumes and Surface Area", Science, vol. 309, No. 5743 (2005, pp. 2040-2042 (Abstract only).

* cited by examiner

*Primary Examiner* — Haytham Soliman
(74) *Attorney, Agent, or Firm* — Richard C. Litman

(57) ABSTRACT

The composite adsorbent for an adsorption chiller is a composite material formed from multi-walled carbon nanotubes incorporated into a metal organic framework, where the metal organic framework is MIL-101(Cr). The MIL-101 family of metal organic frameworks include terephthalate (benzene 1,4-dicarboxylate) linkers and $M_3O$-carboxylate trimers (M=Cr or Fe) with octrahedrally coordinated metal ions binding terminal water molecules. MIL-101 frameworks having a crystal structure with very large pore sizes (29 and 34 Angstroms) and surface area, and are known to have a large water uptake. However, metal organic frameworks have low thermal conductivity due to the presence of organic matter, resulting in lower heat transfer rates and greater cycle time, and are not stable in aqueous media or disintegrate slowly upon recurrent hydrothermal cycling. Composite binding with multi-wall carbon nanotubes improves heat transfer characteristics and thermal stability.

1 Claim, No Drawings

COMPOSITE ADSORBENT FOR ADSORPTION CHILLER

BACKGROUND OF THE INVENTION

1. Field of the Invention

The present invention relates to adsorbent materials for use in adsorption chillers, and particularly to a composite adsorbent for an adsorption chiller, the composite adsorbent being formed from multi-walled carbon nanotubes incorporated into a MIL-101(Cr) metal organic framework.

2. Description of the Related Art

Adsorption chillers combine an adsorbent with a refrigerant, allowing the chiller to use heat to provide a cooling effect. This heat, typically in the form of hot water, may come from any number of industrial sources, including waste heat from industrial processes, prime heat from solar thermal installations, or from the exhaust or water jacket heat of a piston engine or turbine.

Although there are similarities between absorption and adsorption refrigeration, absorption refrigeration utilizes a process in which a refrigerant fluid is dissolved by a liquid or solid sorbent, while adsorption refrigeration utilizes a process in which the refrigerant fluid adheres to the surface of the sorbent. Typical refrigerant/absorbent pairs used in absorption chillers include ammonia/water or water/lithium bromide solution, while typical refrigerant sorbent pairs in adsorption chillers include water/silica gel or water/zeolite. The adsorption chamber of the adsorption chiller is filled with a solid material (for example, a zeolite or silica gel) which, in its neutral state, has adsorbed the refrigerant. When heated, the solid desorbs (i.e., releases) refrigerant vapor, which subsequently is cooled and liquefied. This liquid refrigerant then provides its cooling effect at the evaporator, by absorbing external heat and turning back into a vapor. In the final stage, the refrigerant vapor is re-adsorbed into the solid.

Conventional small-scale solar adsorption chillers generally employ silica gel/water or zeolite/water working pairs, due to their relatively high levels of mesoporosity and water affinity. However, the coefficient of performance (COP) and specific cooling power (SCP) evaluated for an adsorption chiller using these adsorbent/adsorbate pairs make their use feasible only for small scale use, since both the COP and SCP are far too small for practical use in a larger scale system, such as for commercial or industrial applications.

Thus, a composite adsorbent for an adsorption chiller solving the aforementioned problems is desired.

SUMMARY OF THE INVENTION

The composite adsorbent for an adsorption chiller is a composite material formed from multi-walled carbon nanotubes incorporated into a metal organic framework, where the metal organic framework is MIL-101(Cr). The MIL-101 family of metal organic frameworks include terephthalate (benzene 1,4-dicarboxylate) linkers and $M_3O$-carboxylate trimers (M=Cr or Fe) with octrahedrally coordinated metal ions binding terminal water molecules. MIL-101 frameworks having a crystal structure with very large pore sizes (29 and 34 Angstroms) and surface area, and are known to have a large water uptake. However, metal organic frameworks have low thermal conductivity due to the presence of organic matter, resulting in lower heat transfer rates and greater cycle time, and are not stable in aqueous media or disintegrate slowly upon recurrent hydrothermal cycling. Composite binding with multi-wall carbon nanotubes improves heat transfer characteristics and thermal stability.

The metal organic framework and multi-walled carbon nanotube composite adsorbent is made by mixing a chromium(III) precursor salt and multi-walled carbon nanotubes functionalized with $COOH^{-1}$ functional groups in water to form a first mixture. The first mixture is then sonicated, and 1,4-benzenedicarboxylic acid is added to the first mixture to form a second mixture. The second mixture is then sonicated and heated. The second mixture is then filtered to yield a filtered solid, which is washed and dried to produce the metal organic framework and multi-walled carbon nanotube composite adsorbent.

These and other features of the present invention will become readily apparent upon further review of the following specification.

DETAILED DESCRIPTION OF THE PREFERRED EMBODIMENTS

The composite adsorbent for an adsorption chiller is a composite material formed from multi-walled carbon nanotubes incorporated into a metal organic framework, where the metal organic framework is MIL-101(Cr). The MIL-101 family of metal organic frameworks include terephthalate (benzene 1,4-dicarboxylate) linkers and $M_3O$-carboxylate trimers (M=Cr or Fe) with octrahedrally coordinated metal ions binding terminal water molecules. MIL-101 frameworks having a crystal structure with very large pore sizes (29 and 34 Angstroms) and surface area, and are known to have a large water uptake. However, metal organic frameworks have low thermal conductivity due to the presence of organic matter, resulting in lower heat transfer rates and greater cycle time, and are not stable in aqueous media or disintegrate slowly upon recurrent hydrothermal cycling. Composite binding with multi-wall carbon nanotubes improves heat transfer characteristics and thermal stability.

MIL-101(Cr) has the general formula $[Cr_3(O)—X(bdc)_3(H_2O)_2]$, where bdc=benzene-1,4-dicarboxylate, and X=OH or F. When originally synthesized by G. Ferey et al. (see "A Chromium Terephthalate-Based Solid with Unusually Large Pore Volumes and Surface Area", Science, vol. 309, no. 5743 (2005), pp. 2040-2042, the synthesis was performed using hydrogen fluoride. However, hydrogen fluoride is quite toxic and not suitable for industrial applications. For purposes of the present description, MIL-101 (Cr) may be understood to have the formula $Cr_3(H_2O)_2O[(O_2C)—C_6H_4—(CO_2)]_3.mH_2O$.

The metal organic framework and multi-walled carbon nanotube composite adsorbent is made by mixing a chromium(III) precursor salt and multi-walled carbon nanotubes functionalized with $COOH^{-1}$ functional groups in water to form a first mixture. The chromium(III) precursor salt may be chromium(III) chloride hexahydrate ($CrCl_3.6H_2O$), chromium(III) acetylacetonate ($Cr(C_5H_7O_2)_3$) or, preferably, chromium(III) nitrate nonahydrate ($Cr(NO_3)_3.9H_2O$). The multi-walled carbon nanotubes functionalized with $COOH^{-1}$ may be formed by any conventional method. In one example, 3 g of multi-walled carbon nanotubes may be mixed with 300 mL of $HNO_3$ (70%) to form a mixture. The mixture is preferably vigorously stirred in a 500 mL flask equipped with a condenser. The mixture is then ultrasonicated at 40 kHz for 30 minutes, and then stirred for 48 hours under reflux in an oil bath at a temperature of 120° C. to form a reaction mixture. After cooling, the reaction mixture is diluted with 500 mL of deionized water and then vacuum filtered (using 2.5 μm filter paper) to yield a filtrate. The filtrate is dispersed in 500 mL of water and vacuum filtered, followed by rinsing the filtered cake with 200 mL of water. The latter three steps of dispersion, vacuum filtering and rinsing are repeated until the pH of the filtrate is 5. The filtrate is then rinsed with 200 mL of acetone, and then dried for two days at a temperature of 150° C. to yield the multi-walled carbon nanotubes functionalized with $COOH^{-1}$.

The first mixture, which is formed from the chromium (III) precursor salt (10 mmol, 4 g) and multi-walled carbon nanotubes functionalized with $COOH^{-1}$ (weighed according to the desired volume fraction) in 50 mL of water, is then sonicated for 12 hours at room temperature. 1,4-benzenedicarboxylic acid (9.8 mmol, 1.64 g) is then added to form a second mixture. The second mixture is then sonicated for two hours at room temperature and then heated. Heating preferably takes place in a Teflon®-lined pressure vessel, and held at a temperature of 220° C. for 16 hours. As an alternative to sonication of the first mixture, the first mixture can also be stirred by an agitator.

The second mixture is then filtered to yield a filtered solid. The filtered solid is washed with deionized water at 70° C. for five hours, centrifuged at 9,000 RPM for 15 minutes, washed again with ethanol at 60° C. for three hours, and then centrifuged again at 9,000 RPM for 15 minutes. The latter four steps of washing, centrifuging, washing again and centrifuging again are preferably repeated until the centrifuged-off solvent becomes colorless.

The filtered and washed solid is then washed again with 30 mM $NH_4F$ solution at a temperature of 60° C. for ten hours, followed by washing again with deionized water (preferably five times) at 60° C., and finally air drying at 105° C. for 24 hours to produce the metal organic framework and multi-walled carbon nanotube composite adsorbent in the form of a composite powder.

The above process is a hydrothermal synthesis which results in the formation, growth, and coalescence of MIL-101(Cr) crystals on the surfaces of the multi-walled carbon nanotubes. This involves the chemical reaction of the organic linker (1,4-benzenedicarboxylic acid), with the $Cr^{+3}$ ions attached, onto the sidewalls of the MWCNTs, resulting in the formation of well-faceted MIL-101(Cr) crystals. The growth and coalescence of the MIL-101(Cr) crystals, which takes place simultaneously, results in a bulk composite body in which the multi-walled carbon nanotubes are embedded inside the MIL-101(Cr) matrix via strong interfacial bonding. Thus, the molecular level mixing strategy described above takes advantage of the molecular level interaction between the negatively charged carboxyl ($COOH^{-1}$) groups on the functionalized multi-walled carbon nanotubes and the positively charged $Cr^{+3}$ ions within the common solvent. This molecular interaction finally results in the strong interfacial bonding between the multi-walled carbon nanotubes and the surrounding MIL-101(Cr) matrix, resulting in a smooth transfer of phonons from the nanotubes to the MOF, and thus better heat transfer characteristics of the composite adsorbent.

The process further ensures that the growth of the MOF crystals initiates on the surfaces of the multi-walled carbon nanotubes, thus preserving the intrinsic porosity, and thus the maximum water uptake capacity of the MOF matrix. Since carbon is a highly stable material in an inert atmosphere, the presence of multi-walled carbon nanotubes also enhances the effective thermal stability of the composite adsorbent at elevated temperatures during service in a conventional adsorption chiller, as such adsorption beds are sealed inside an evacuated chamber. The present composite adsorbent has a very high coefficient of performance and specific cooling power, combining the highest presently reported water uptake (from MIL-101(Cr)) with the extremely high thermal conductivity of multi-walled carbon nanotubes, in a cost-effective manner, without degrading the intrinsic water uptake of MIL-101(Cr).

It is to be understood that the present invention is not limited to the embodiments described above, but encompasses any and all embodiments within the scope of the following claims.

We claim:

1. An adsorbent for an adsorption chiller, consisting of a composite of multi-walled carbon nanotubes embedded in a metal organic framework, wherein said metal organic framework consists of MIL-101(Cr) having the formula $Cr_3(H_2O)_2O[(O_2C)-C_6H_4-(CO_2)]_3 \cdot mH_2O$.

* * * * *